Figure 1:
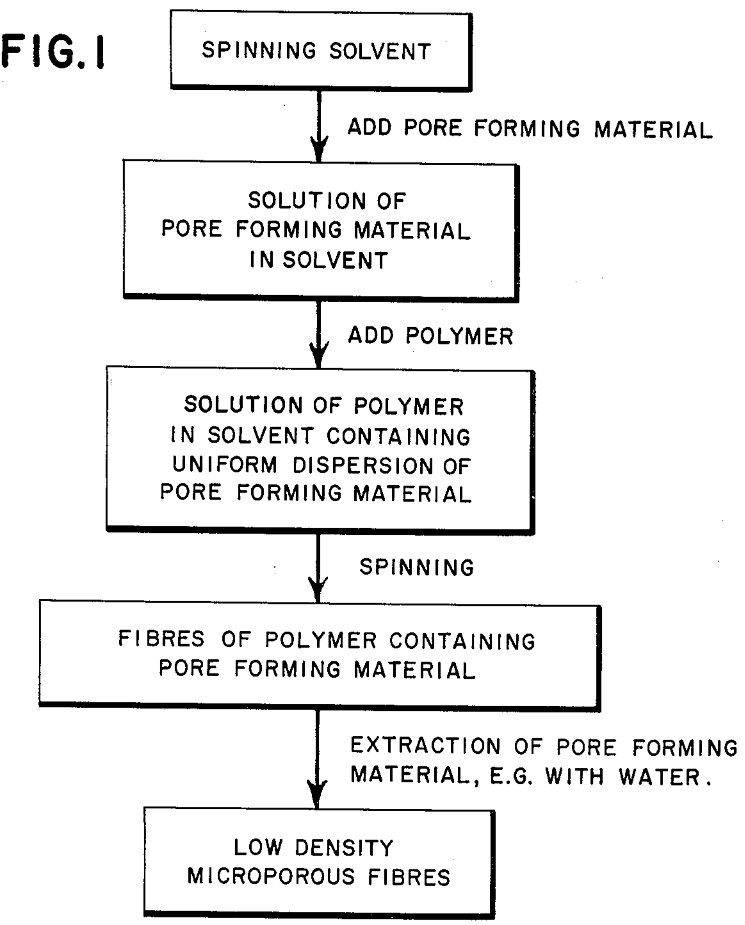

Feb. 15, 1966 F. MICHEL 3,235,634

PROCESS FOR PRODUCING MICROPOROUS FIBERS AND VINYL CHLORIDE SPINNING SOLUTION THEREFOR

Filed Feb. 8, 1962

INVENTOR

Fleury Michel

BY Stevens, Davis, Miller & Mosher

ATTORNEYS 3,235,634

PROCESS FOR PRODUCING MICROPOROUS FIBERS AND VINYL CHLORIDE SPINNING SOLUTIONS THEREFOR

Fleury Michel, Tronville-en-Barrois, France, assignor to Societe Rhovyl, Paris, France, a French body corporate
Filed Feb. 8, 1962, Ser. No. 171,820
Claims priority, application France, Feb. 10, 1961, 852,334
13 Claims. (Cl. 264—49)

This invention relates to the process for producing microporous fibers and vinyl chloride spinning solutions therefor.

There has already been described, notably in French Patent No. 913,164, the production of textile articles such as filaments, continuous threads and staple fibres (all hereinafter referred to generically as fibres) from polymers or copolymers containing at least 85% of vinyl chloride (herein called "vinyl chloride polymers"). The ethylenically unsaturated monomers with which vinyl chloride can be copolymerised in the indicated proportions to give fibre-forming copolymers are well known and need not be set out in detail. Vinyl acetate is a typical example.

The fibres obtained by the processes hitherto known have a density in the neighbourhood of that of the polymer employed, that is to say about 1.4, and owing to their homogeneous structure they possess a transparency and a thermal conductivity which it is desirable to correct.

It is an object of the present invention to provide a process for the production of porous, low density vinyl chloride fibers which is simple and applicable to continuous production.

It is a further object to provide spinning solutions for use in said process.

Other objects will appear hereinafter.

According to the invention vinyl chloride polymer fibres are obtained by spinning a solution of the vinyl chloride polymer containing, as a pore forming material, dispersed in the solution 2–25% (on the weight of the polymer) of a substance which is soluble to an extent above 2% (on the weight of the polymer) in the solvent, is free from a tendency to leave the polymer with the solvent in a spinning operation, and is incompatible with the polymer and insoluble in the solution of the polymer, and subsequently removing the porogenous substance from the fibres formed. Preferably the pore forming material is a liquid which is incompatible with the polymer.

The solution can be spun by the usual methods, the conditions being so chosen that the pore forming material is not prematurely eliminated before the consolidation of the structure of the fibre. Afterwards the fibres can be subjected to an extraction treatment, e.g. with water or other aqueous liquid, which eliminates the pore forming material and imparts to the fibres a microporous structure.

The solvents employed to dissolve the vinyl chloride polymers may be those generally known for this purpose and may be very varied. Good results are obtained in particular with tetrahydrofuran, ethylene oxide, propylene oxide, and mixtures of carbon disulphide, benzene or perchloroethylene with acetone.

Of course, there may be added to the spinning solutions conventional ingredients such as delustering agents, dyes, pigments, antistatic agents, lubricants, stabilisers, etc.

The pore forming materials are characterised by possessing the following combination of properties:

(1) They are soluble in the spinning solvent at least to an extent within the above-defined limits of concentration in which they are used.

(2) They have no tendency to leave the polymer together with the solvent, that is to say, they are, for example, distinctly less volatile than the solvent employed, when the solution is shaped by dry spinning, or insoluble in the first coagulation bath if the shaping of the solution is effected by wet spinning.

(3) They are substantially incompatible with the vinyl chloride polymer employed and insoluble in the spinning solution.

The last property is particularly important. In the course of the solution of the polymer in the solvent containing the pore forming material, the latter, owing to its incompatibility with the polymer, gradually separates in the form of micro-droplets very uniformly distributed throughout the solution. This distribution can be obtained only if the pore forming material is dissolved in the solvent before the introduction of the polymer; if it is incorporated in an already prepared solution of the polymer a coarse and less uniform and hence less desirable distribution results.

Many organic compounds satisfy these conditions. Particularly interesting results are obtained with compounds having an alcohol function, e.g. mono-alcohols such as allyl alcohol, di-alcohols such as ethylene glycol, polyethylene glycols, especially those with 1–5 ether linkages, e.g. diethylene glycol, and hexaethylene glycol, and tri-alcohols such as glycerol, this list having no limiting character and being given only by way of example.

After spinning, the filaments are treated in water or any other appropriate solvent to effect the extraction of the vesicles of the pore forming material which they contain, without any modification to their own structure. This extraction may take place in a special treatment or it may be combined with one of the usual finishing treatments for vinyl chloride polymer fibres, such as washing, stretching, stabilisation, shrinkage, dyeing, etc.

By the process of the invention fibres whose density may be as low as 0.90, depending upon the quantity of pore forming material employed, and whose insulating properties in particular are substantially better than those of vinyl chloride polymer fibres of the normal density of about 1.4.

Figure 2:
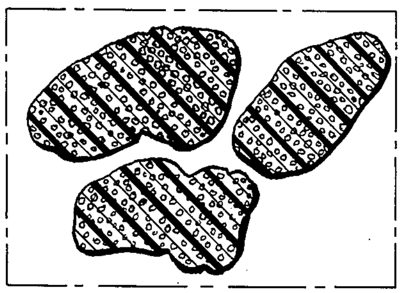
Figure 3:
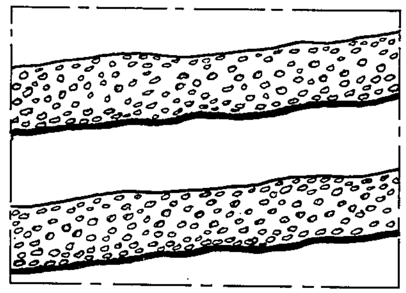

The invention is further illustrated by reference to the acompanying drawing in which FIGURE 1 is a flow diagram setting forth the steps of the process;

FIGURE 2 is a magnified cross-sectional view of fibers produced according to the process; and FIGURE 3 is a magnified plan view of the surface of the fibers produced by the process of the invention.

The following examples illustrate the practical application of the invention.

EXAMPLE I 50 g. of diethylene glycol are incorporated in a mixture of carbon disulphide 1500 g., acetone 1000 g.

There is then dissolved in this solvent 1000 g. of polyvinyl chloride having a K value of 65 (KW 65). The solution obtained is extruded through a spinneret having 64 holes of diameter 0.08 mm. into an atmosphere maintained at 85° C. The filaments obtained are stretched by 5 times their original length in boiling water. After drying, it is found that the density of the filaments obtained varies from 1.1 to 1.35 with a mean value of 1.3.

EXAMPLE II 100 g. of monoethylene glycol are incorporated in a mixture of carbon disulphide 1500 g., acetone 1000 g.

After complete solution of the monoethylene glycol there is dissolved in this solvent 950 g. of a vinyl chloride polymer of KW 67. The solution is extruded through a spinneret having 300 holes of 0.06 mm. diameter into an atmosphere maintained at 85° C.

The filaments obtained are stretched by 4 times their original length in boiling water, and then give a shrinking treatment, also in boiling water. After drying, it is found that the density of the filaments obtained varies from 0.9 to 1.30, with a mean value in the neighbourhood of 1.20.

EXAMPLE III

A solution is prepared and spun in accordance with Example II, except that the monoethylene glycol is replaced by glycerol. The fibres obtained are stretched in boiling water and then dyed at 60° C., in a bath containing plastosoluble dyes. After drying, it is found that the mean density of the dyed fibres is in the neighbourhood of 1.25.

I claim:

1. Spinning solutions comprising a vinyl chloride polymer of vinyl chloride content 85–100% in an organic spinning solvent therefor and containing as a uniform fine dispersion 2–25% (on the weight of the polymer) of a water-soluble alcohol which is soluble to an extent above 2% in the spinning solvent employed, is free from a tendency to leave the polymer with the spinning solvent in a spinning operation and is chemically stable under the conditions of the spinning operation, and is incompatible with the polymer and insoluble in the spinning solution.

2. Spinning solutions according to claim 1, wherein the water-soluble alcohol is selected from the group which consists of allyl alcohol, ethylene glycol, polyethylene glycols having 1–5 ether linkages, and glycerol.

3. Spinning solutions according to claim 1, wherein the spinning solvent is selected from the group which consists of tetrahydrofurane, ethylene oxide, propylene oxide, and mixtures of acetone with carbon disulphide, benzene and perchloroethylene respectively.

4. Process for the production of microporous fibres of a vinyl chloride polymer of vinyl chloride content 85–100% having a density substantially below 1.4 which comprises spinning a solution of the vinyl chloride polymer in an organic spinning solvent containing, as a pore forming material, dispersed in the solution 2–25% (on the weight of the polymer) of a water-soluble alcohol which is soluble to an extent above 2% (on the weight of the polymer) in the spinning solvent, is free from a tendency to leave the polymer with the spinning solvent in a spinning operation and is chemically stable under the conditions of the spinning operation, and is incompatible with the polymer and insoluble in the solution of the polymer, and subsequently removing the pore forming material from the fibres formed.

5. Process according to claim 4, wherein the spinning solution is made by first dissolving the pore-forming material in the spinning solvent, and then dissolving the polymer in the solution so obtained, so causing the pore forming material to separate as a fine uniform dispersion.

6. Process according to claim 4, wherein the pore forming material is removed from the fibres by solvent extraction in an operation for this sole purpose.

7. Process according to claim 4, wherein the pore forming material is removed from the fibres by solvent extraction during a finishing treatment selected from the group consisting of washing, stretching stabilisation, shrinking and dyeing treatments.

8. Process according to claim 4, wherein the pore forming material is extracted from the fibres with an aqueous liquid.

9. Process according to claim 8, wherein the pore forming material is selected from the group which consists of allyl alcohol, ethylene glycol, polyethylene glycols having 1–5 ether linkages, and glycerol.

10. Process according to claim 8, wherein the spinning solvent is selected from the group which consists of tetrahydrofurane, ethylene oxide, propylene oxide, and mixtures of acetone with carbon disulphide, benzene and perchloroethylene respectively.

11. Process for the production of microporous fibres of a vinyl chloride polymer of vinyl chloride content 85–100% having a density substantially below 1.4, which comprises dissolving in an organic solvent for the vinyl chloride polymer a water-soluble alcohol, as a pore forming material, which is soluble in the said solvent but incompatible with the polymer and insoluble in a solution thereof in the said solvent, dissolving the polymer in the solution so obtained, so causing the porogenous substance to separate as a fine uniform dispersion, shaping the resulting composition into fibre form and setting it by removing solvent therefrom while retaining substantially all the pore forming material in the fibres so formed, and extracting the pore forming material from the fibres, the amount of pore forming material which is initially dissolved in the solvent being equal to 2–25% of the weight of polymer subsequently dissolved and the pore forming substance being chemically stable under the conditions of the shaping and setting steps.

12. Process according to claim 11, wherein the pore forming material is selected from the group which consists of allyl alcohol, ethylene glycol, polyethylene glycols having 1–5 ether linkages, and glycerol.

13. Process according to claim 12, wherein the spinning solvent is selected from the group which consists of tetrahydrofurane, ethylene oxide, propylene oxide and mixtures of acetone with carbon disulphide, benzene and perchloroethylene respectively.

References Cited by the Examiner

UNITED STATES PATENTS

| | | | |
|---|---|---|---|
| 1,707,164 | 3/1929 | Karplus | 264—49 |
| 2,136,464 | 11/1938 | Lyon et al. | 18—54 |
| 2,777,824 | 1/1957 | Leeds | 260—2.5 |
| 2,835,551 | 5/1958 | Kosuge | 18—54 |
| 2,846,727 | 8/1958 | Bechtold | 264—49 X |
| 2,888,415 | 5/1959 | Jankens | 260—2.5 |
| 2,894,289 | 7/1959 | Harper et al. | 264—49 |
| 2,918,445 | 12/1959 | Tarwid | 260—33.2 X |
| 2,922,776 | 1/1960 | Wulff et al. | 260—33.2 X |
| 2,957,843 | 10/1960 | Anderson et al. | 260—33.2 |
| 3,020,597 | 2/1962 | Smith-Johannson | 264—49 |

ALEXANDER H. BRODMERKEL, *Primary Examiner.*

WILLIAM H. SHORT, *Examiner.*